US009001037B2

(12) United States Patent  (10) Patent No.: US 9,001,037 B2
Cheng  (45) Date of Patent: Apr. 7, 2015

(54) POINTER POSITIONING SYSTEM

(71) Applicant: Zeroplus Technology Co., Ltd., New Taipei (TW)

(72) Inventor: Chiu-Hao Cheng, New Taipei (TW)

(73) Assignee: Zeroplus Technology Co., Ltd., New Taipei (TW)

( * ) Notice: Subject to any disclaimer, the term of this patent is extended or adjusted under 35 U.S.C. 154(b) by 228 days.

(21) Appl. No.: 13/736,375

(22) Filed: Jan. 8, 2013

(65) Prior Publication Data

US 2014/0191957 A1 Jul. 10, 2014

(51) Int. Cl.
*G06F 3/033* (2013.01)
*G06F 3/03* (2006.01)
*G06F 3/0346* (2013.01)
*A63F 13/837* (2014.01)
*A63F 13/219* (2014.01)

(52) U.S. Cl.
CPC ............ *G06F 3/0321* (2013.01); *G06F 3/0346* (2013.01); *A63F 13/837* (2014.09); *A63F 13/219* (2014.09)

(58) Field of Classification Search
CPC . G06F 3/03542; G06F 3/0317; G06F 3/0425; G06F 3/0481; A63F 13/219
USPC .................................................. 345/157, 175
See application file for complete search history.

(56) References Cited

U.S. PATENT DOCUMENTS

| 5,816,817 | A | * | 10/1998 | Tsang et al. | 434/22 |
|---|---|---|---|---|---|
| 6,110,039 | A | * | 8/2000 | Oh | 463/2 |
| 6,317,118 | B1 | * | 11/2001 | Yoneno | 345/158 |
| 6,570,104 | B1 | * | 5/2003 | Ericson et al. | 178/18.09 |
| 6,598,978 | B2 | | 7/2003 | Hasegawa | |
| 2004/0085301 | A1 | * | 5/2004 | Furukawa et al. | 345/179 |
| 2004/0113898 | A1 | * | 6/2004 | Pettersson et al. | 345/179 |
| 2010/0178967 | A1 | * | 7/2010 | Cheng et al. | 463/5 |
| 2011/0298710 | A1 | * | 12/2011 | Ruckhaeberle et al. | 345/158 |
| 2012/0314085 | A1 | * | 12/2012 | Gohshi et al. | 348/164 |
| 2013/0093733 | A1 | * | 4/2013 | Yoshida | 345/179 |
| 2013/0100009 | A1 | * | 4/2013 | Willis et al. | 345/156 |

* cited by examiner

*Primary Examiner* — Alexander Eisen
*Assistant Examiner* — Sanjiv D Patel
(74) *Attorney, Agent, or Firm* — Ming Chow; Sinorica, LLC (57) ABSTRACT

A pointer positioning system includes an image generating unit, a light-spot generating unit, an operating unit, a calculating unit, and an image unit. The image generating unit creates an image on a display region. The light-spot generating unit projects positioning spots and identifying spots on the display region. The operating unit has an invisible-light camera to sense an image of a part of the entire display region. The calculating unit compares a distribution of the positioning spots and the identifying spots which is sensed by the invisible-light camera with a reference distribution stored in a memory, and the image unit shows a pointer image at a pointing position of the display region accordingly.

11 Claims, 12 Drawing Sheets

POINTER POSITIONING SYSTEM

BACKGROUND OF THE INVENTION

1. Field of the Invention

The present invention relates generally to an electronic device, and more particular to a pointer positioning system.

2. Description of the Related Art

In recent days, more and more people think that entertainment is an important issue in leisure time. Entertainment may release pressure in work days and enhance the interpersonal relationship. As the improvement of video game industry, all kinds of video games, such as console game, network game and others, are popular to all ages. However, teenagers like shooting arcade games most.

Figure 1:
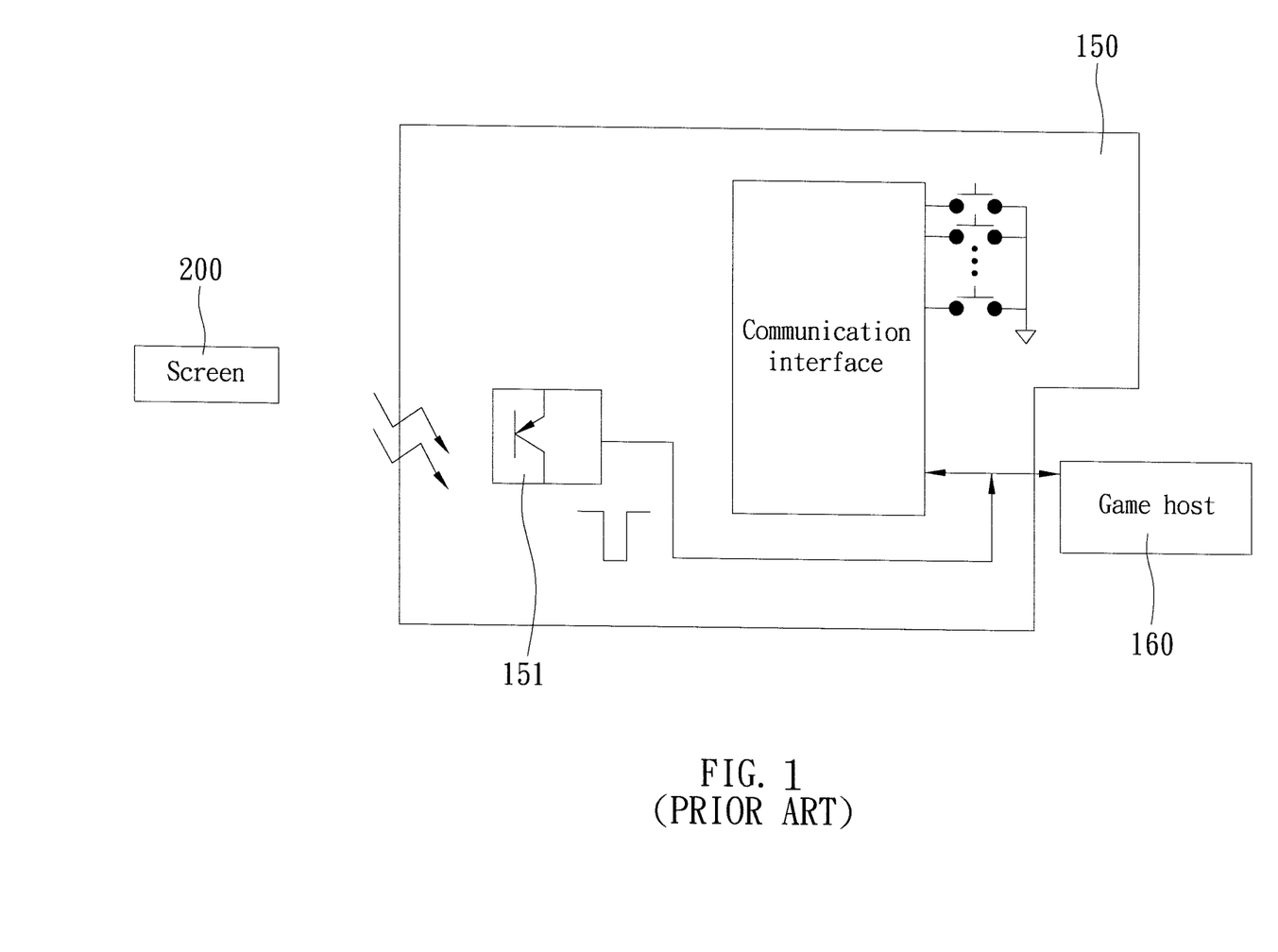
FIG. 1 is a block diagram of the conventional pointer positioning system.

In a modern shooting arcade game, the stick is replaced by an optical gun in the shooting game. Players only have to aim the gun at the targets on the screen and pull the trigger to make them feel like they are really shooting the targets. As shown in FIG. 1, a conventional pointer positioning system includes an optical gun 150 and a game host 160. The optical gun 150 is connected to the game host through a wire. A player may aim the optical gun 150 at a screen 200 of the game host 160 and pull a trigger to make the optical gun 150 emit a cathode ray to the screen 200. The cathode ray hits the screen 200 and generates a hit point signal on the screen 200. The optical gun 150 has a camera to catch an image of the screen 200 to find the location of the hit point signal on the screen 200 in the game host 160. Next, the game host 160 shows a specific image on the location of the hit point.

However, this conventional system only works on a CDT screen or a CRT screen, on which the cathode ray may create the hit point signal only. In present days, CDT screens and CRT screens are replaced by TFT, LCD, PDP, and the like display. This conventional system can't work on the modern displays.

U.S. Pat. No. 6,598,978 taught a pointer positioning system, which may work on a TFT, LCD, or PDP display. The pointer positioning device which is used for pointer positioning in an image display has an auxiliary point, an image sensor and a filter. The auxiliary point was set up in the periphery due to the image display apparatus and creates a specific spectrum. The image sensor receives the optical signal occurred from the auxiliary point. The filter was set up in front of the image sensor using for filter out the optical signal which is not belong to the specific spectrum, such that the image sensor can only receive the specific spectrum signal. Use the auxiliary point as the reference point of initial setup adjusting and pointer positioning, so as to perform pointer positioning in the image display area of the image display apparatus.

Aforesaid system only works on a display with a limited size. However, the sizes of the displays are increasing, and the size goes way beyond the pointer positioning system may cover.

Another improved pointer positioning system is provided with a G-sensor or a gyroscope for signal positioning on the TFT, LCD, PDP, or the similar display. However, the G-sensor and the gyroscope only obtain a relative coordinate, so that it must be compared with a reference to obtain a precise position. It always occurs a shift of the hit point on the screen when there is an error in the comparison.

SUMMARY OF THE INVENTION

The primary objective of the present invention is to provide a pointer positioning system, which may be applied in all kinds of displays and obtain a precise positioning.

According to the objective of the present invention, the present invention provides a pointer positioning system, including an image generating unit, a light-spot generating unit, an operating unit, a calculating unit, and an image unit. The image generating unit creates an image on a display region. The light-spot generating unit projects invisible light to form invisible-light spots on the display region. The invisible-light spots include positioning spots and identifying spots, and the positioning spots divide the display region into several sections. The positioning spots have different parts respectively in the neighboring sections, so that each of the sections has some of the positioning spots therein, and an arrangement of the positioning spots in one of the sections is different from an arrangement of the positioning spots in the other one of the sections. The operating unit has an invisible-light camera to sense an image of a part of the entire display region. The operating unit generates an identification signal according to a distribution of the positioning spots and the identifying spots in the image sensed by the invisible-light camera. The calculating unit has a memory to store a reference distribution of the positioning spots and the identifying spots. The calculating unit receives the identification signal from the operating unit and compares the distribution of the positioning spots and the identifying spots which is sensed by the invisible-light camera with the reference distribution to obtain a position signal accordingly. The position signal indicates a pointing position in the image sensed by the invisible-light camera. The image unit receiving the position signal from the calculating unit and generating an image signal. The image signal is transmitted to the image generating unit to show a pointer image at the pointing position of the display region.

Therefore, the pointer positioning system of the present invention may works in all kinds of displays with a precise positioning.

DETAILED DESCRIPTION OF THE INVENTION

The detailed description and technical contents of the present invention will be explained with reference to the accompanying drawings. However, the drawings are for illustration only and cannot be used to limit the present invention.

Figure 2:
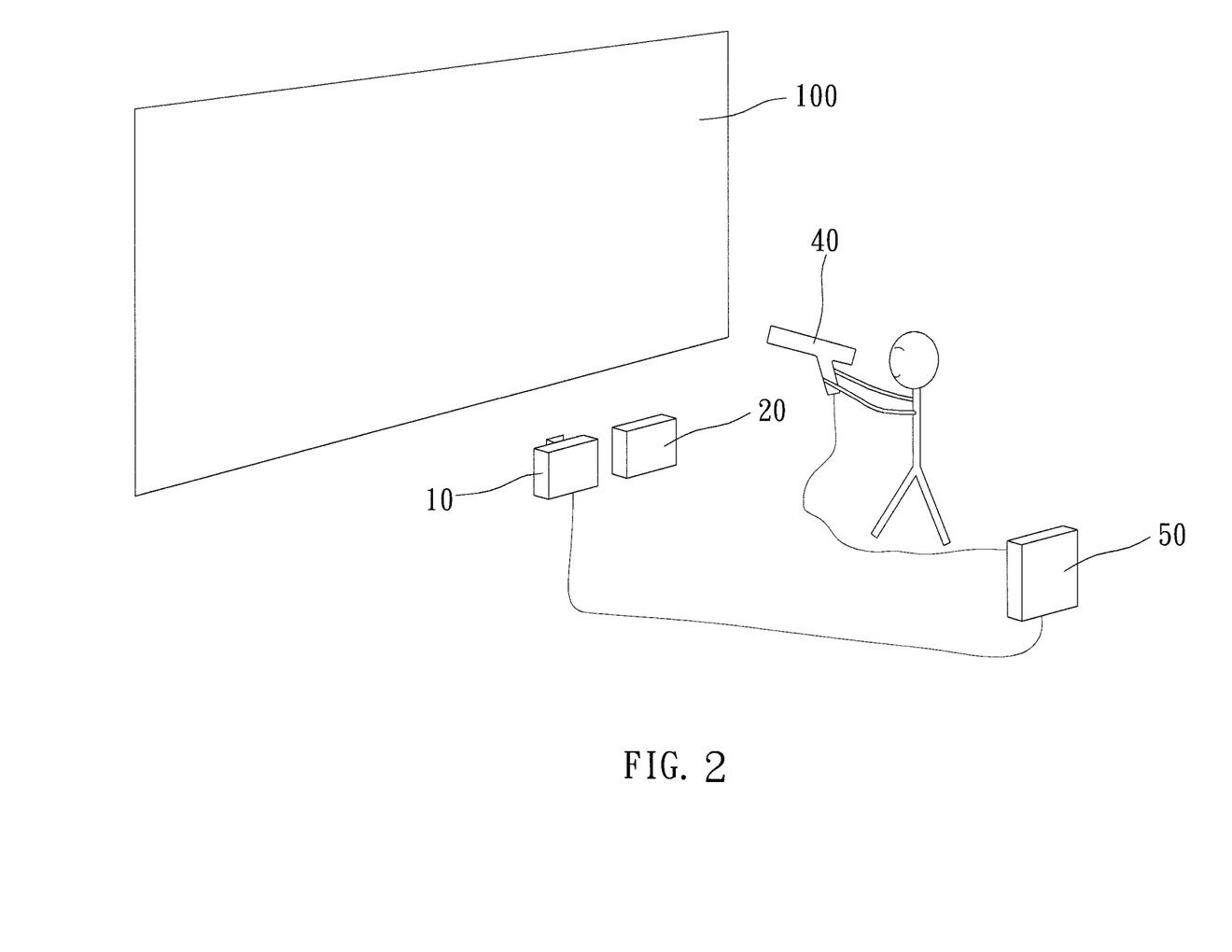
FIG. 2 is a perspective view of a first preferred embodiment of the present invention.
Figure 3:
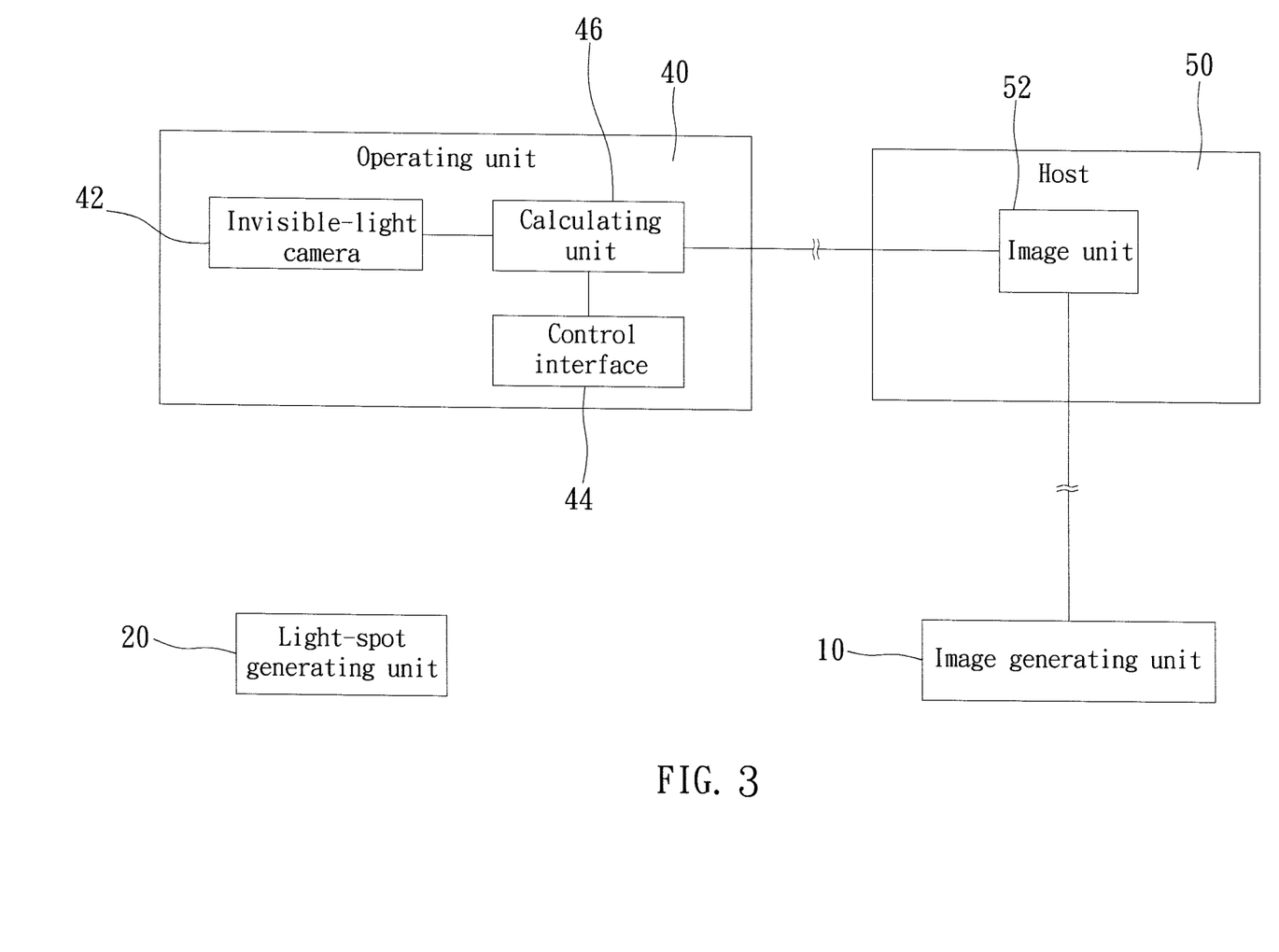
FIG. 3 is a block diagram of the first preferred embodiment of the present invention.

As shown in FIG. 2 and FIG. 3, a pointer positioning system of the first preferred embodiment of the present invention includes an image generating unit 10, a light-spot generating unit 20, an operating unit 40, a calculating unit 46, and a host 50.

The image generating unit 10 creates an image on a display region 100. In an embodiment, the image generating unit 10 is a projector, and the display region 100 is a 1280×800 screen.

Figure 4:
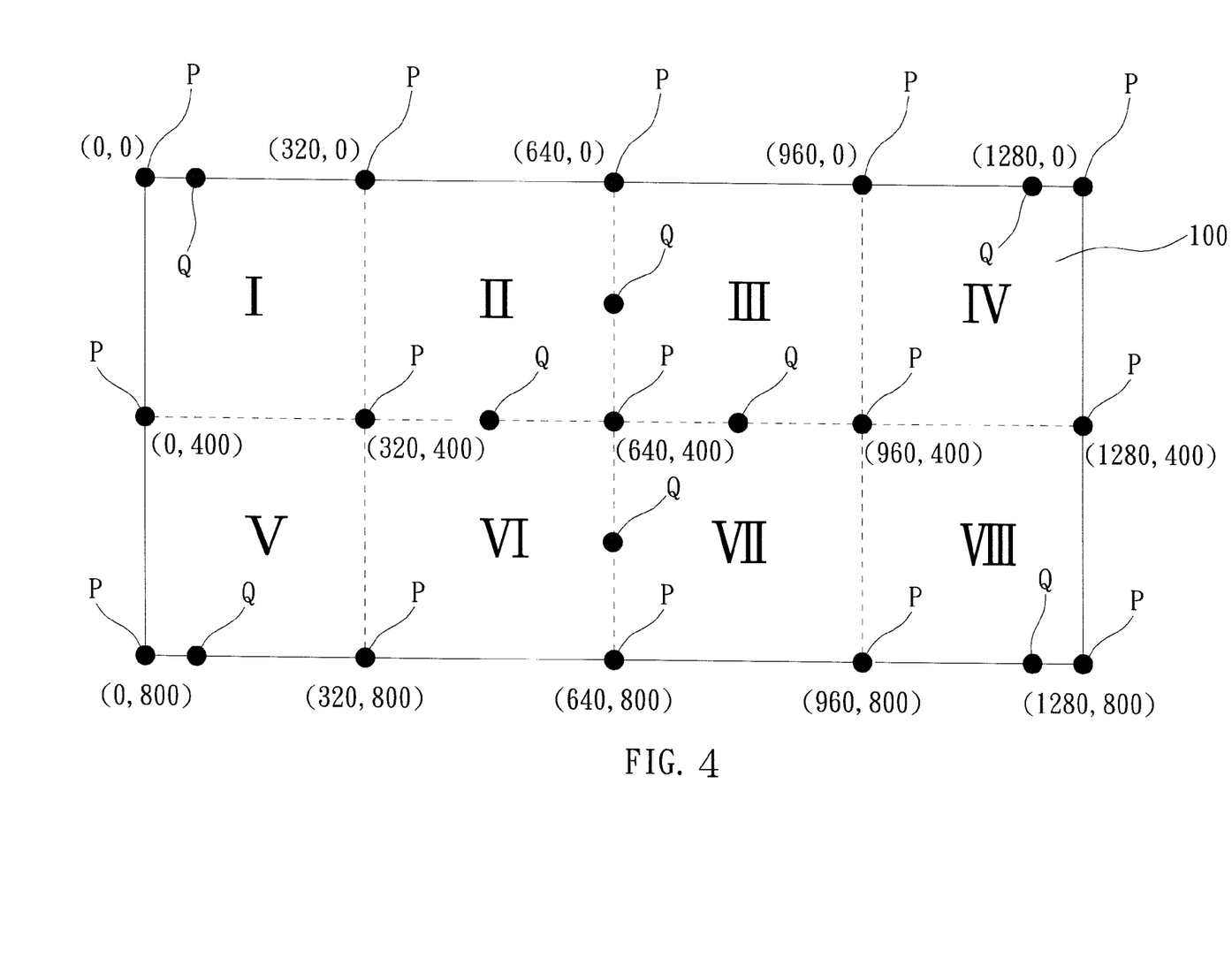
FIG. 4 shows a distribution of the light spots on the display region.

As shown in FIG. 4, the light-spot generating unit 20 emits invisible light to the display region 100 to form a plurality of invisible-light spots on it. In an embodiment, the invisible light is infrared laser with a central wavelength of 850 nm or 940 nm. The invisible-light spots include positioning spots P and identifying spots Q. The positioning spots P form coordinates on the display region 100. The positioning spots P are arranged in an array to divide the display region 100 into eight sections (section I to section VIII). Boundaries between the sections are lines connecting the neighboring positioning spots P. The positioning spots P have a predetermined size, therefore each positioning spot P has different parts in different sections. Take the positioning spot P (320, 400) for example, it has ¼ part in the section I, ¼ part in the section II, ¼ part in the section V, and ¼ part in the section VI. In other words, each section has specific parts of the positioning spot P therein. The identifying spots Q are on the boundaries between the sections, so that they have different parts in different section as well. In other words, each section has the specified parts of the specified positioning spots P and the specified identifying spot(s) Q therein, and distributions of the positioning spots P and the identifying spot(s) Q in each section are different so that it may identify the sections I-VII through the distributions of the positioning spots P and the identifying spot Q.

Figure 5:
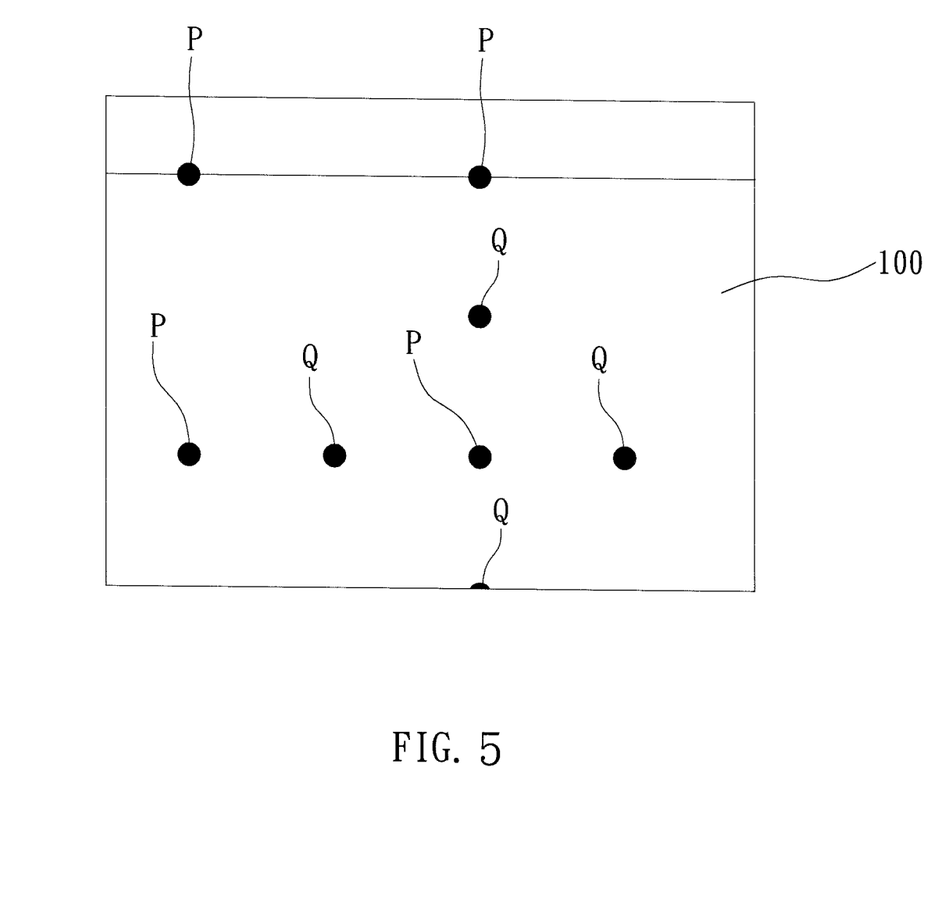
FIG. 5 shows an image which is captured by the invisible camera.

The operating unit 40 is held by a used to point it at the display region 100. The operating unit 40 has an invisible-light camera 42 and a control interface 44. The invisible-light camera 42 catches images of the display region 100 to obtain the positioning spots P and the identifying spots Q (FIG. 5) and generates an identification signal accordingly. The control interface 44 is operated by a user to generate control signals accordingly, such as draw and click. In an embodiment, the control interface 44 is a button.

Figure 6:
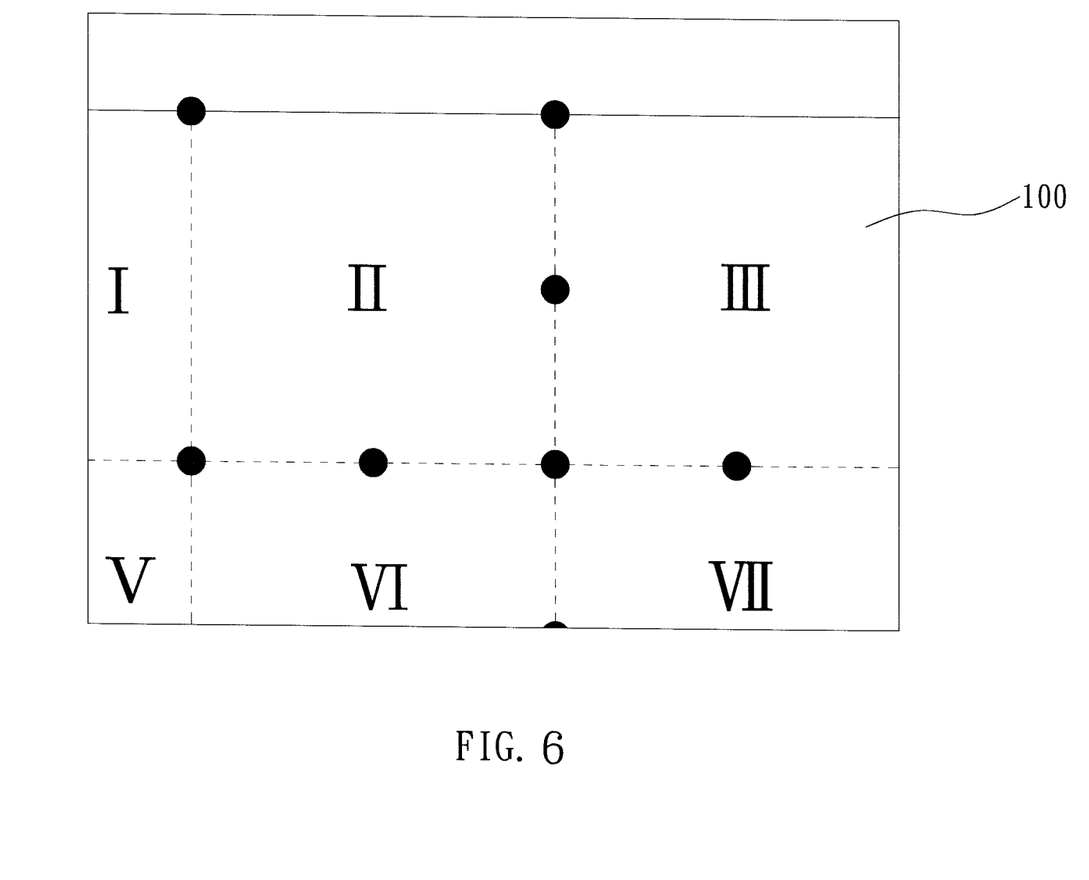
FIG. 6 shows the relationship of FIG. 4 and FIG. 5.
Figure 7:
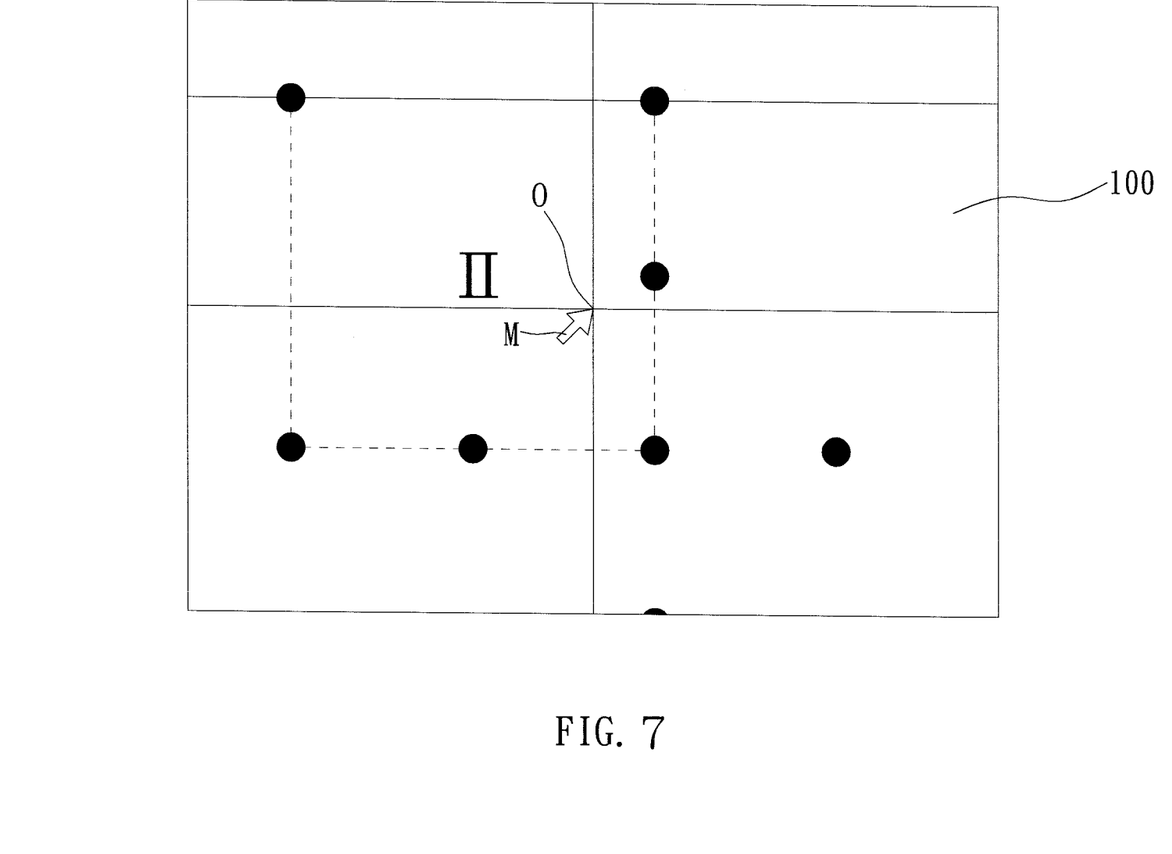
FIG. 7 shows the center of the FIG. 5 in the section II of FIG. 6.

The calculating unit 46 is provided in the operating unit 40. The calculating unit 46 has a memory (not shown) to store data. The data include a reference distribution of the positioning spots P and the identifying spots Q. The calculating unit 46 is electrically connected to the invisible-light camera 42 and the control interface 44 to receive the identification signal and the control signal. The calculating unit 46 obtains a present distribution of the positioning spots P and the identifying spots Q through the identification signal, and compares the present distribution with the reference distribution. In an embodiment, the image caught by the invisible-light camera 42 is a part of the entire display region 100, and the positioning spots P and the identifying spots Q in the image can determine which sections in the image (sections I, II, III, V, VI, and VII are in the image as shown in FIG. 6). Next, the calculating unit 46 calculates a center O of the image and determines which section the center O is located (the center O is located in the section II as shown in FIG. 7). Next, a coordinate of the center O relative to the section where the center O is located, and then an absolute coordinate of the center O relative to the display region 100 may be obtained. Finally, the calculating unit 46 generates a position signal, and the position signal indicates a pointing position of the operating unit on the display region 100, which is the absolute coordinate of the center O. While a use inputs a control signal through the control interface 44, the control signal will be combined with the position signal to form a command signal.

The host 50 has an image unit 52 electrically connected to the image generating unit 10 and the calculating unit 46. The image unit 52 receives the position signal from the calculating unit 46 and generates an image signal accordingly. The image signal is transmitted to the image generating unit 10 to show a pointer image M, such as arrow, hand or sight at the pointing position center O (the pointing position) on the display region 100 (FIG. 7), and movement of the pointer image M (displacement or zoom in/out).

Figure 8:
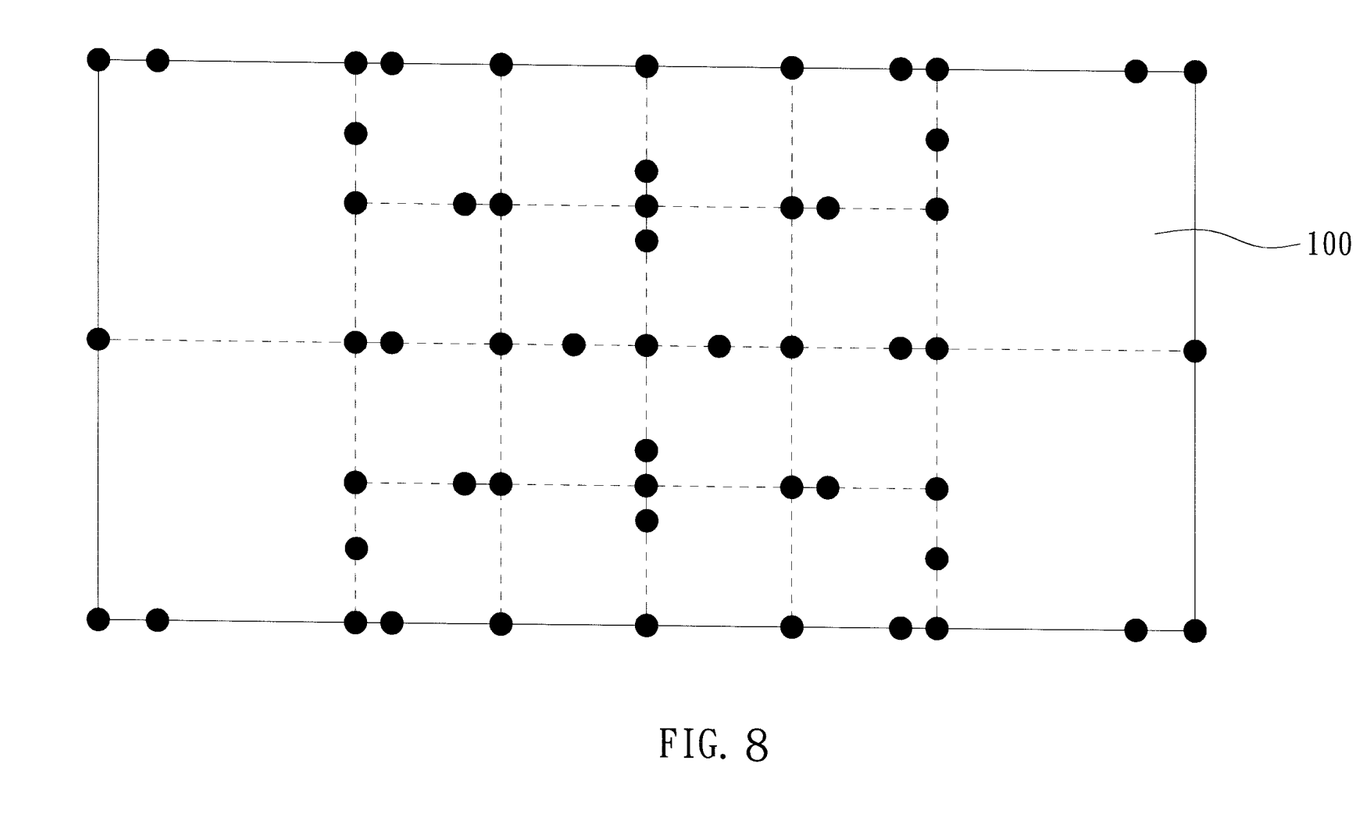
FIG. 8 shows the distribution of the light spots which may enhance the identification of positioning in the central section.

The point positioning system of the present invention may work for all kinds of displays, including CDT, CRT, TFT LCD, PDP, and the other displays. FIG. 8 shows another distribution of the positioning spots P and the identifying spots Q. The distribution is uneven, and mores spots are arranged in an area where needs precisely positioning.

Figure 9:
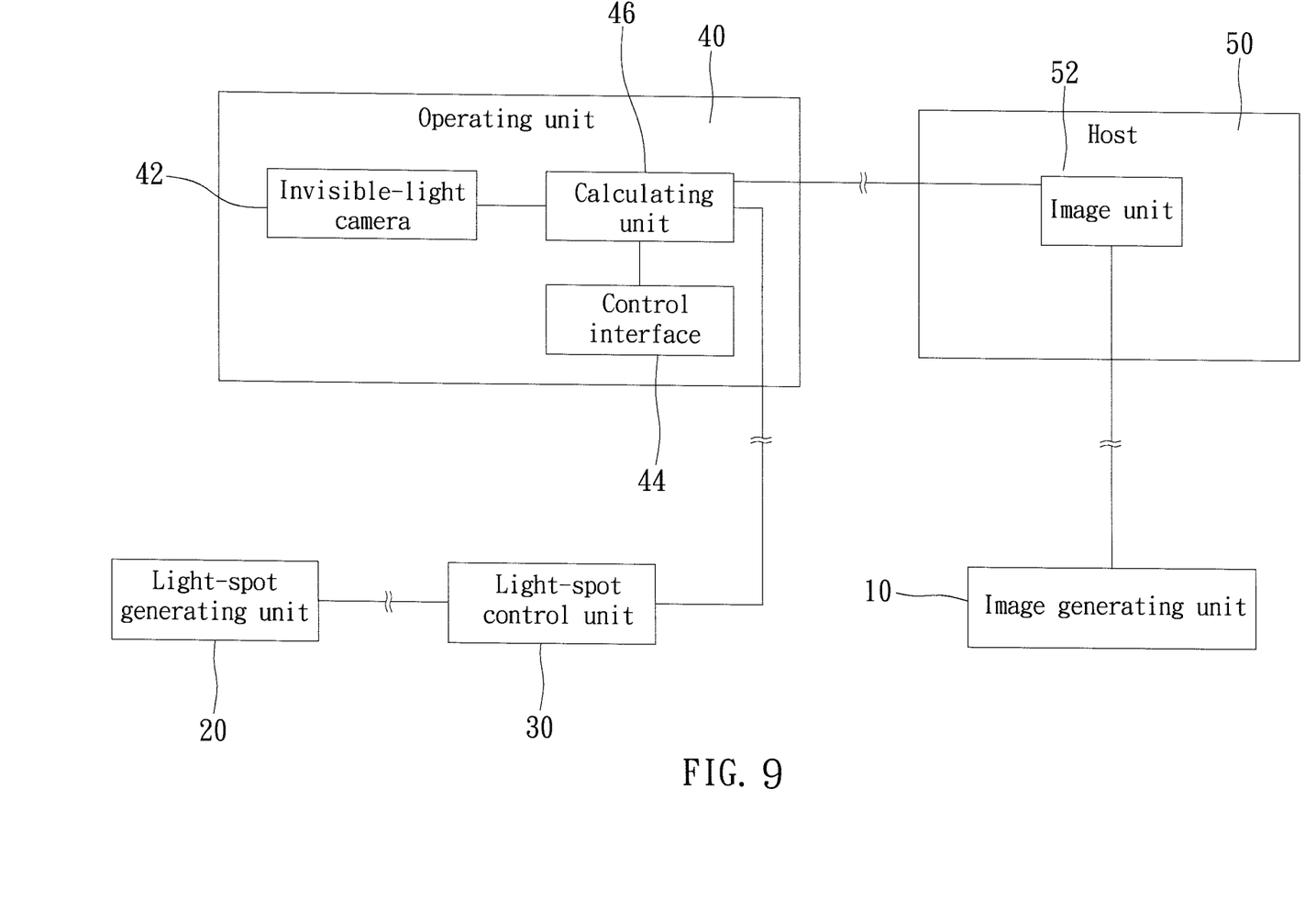
FIG. 9 is a block diagram of a second preferred embodiment of the present invention.

As shown in FIG. 9, a pointer positioning system of the second preferred embodiment of the present invention is similar to the first embodiment, and further includes a light-spot control unit 30. The light-spot control unit 30 is electrically connected to the light-spot generating unit 20 and the calculating unit 46. The light-spot control device 30 controls light-spot generating unit 20 to provide a specific distribution of the positioning spots P and the identifying spots Q on the display region 100, and the distribution will be transmitted to the calculating unit 46 and saved in the memory at the same time to be the reference distribution. The light-spot control device 30 is controllable by a user that the distribution of the positioning spots P and the identifying spots Q is changeable according to the command of the user.

Figure 10:
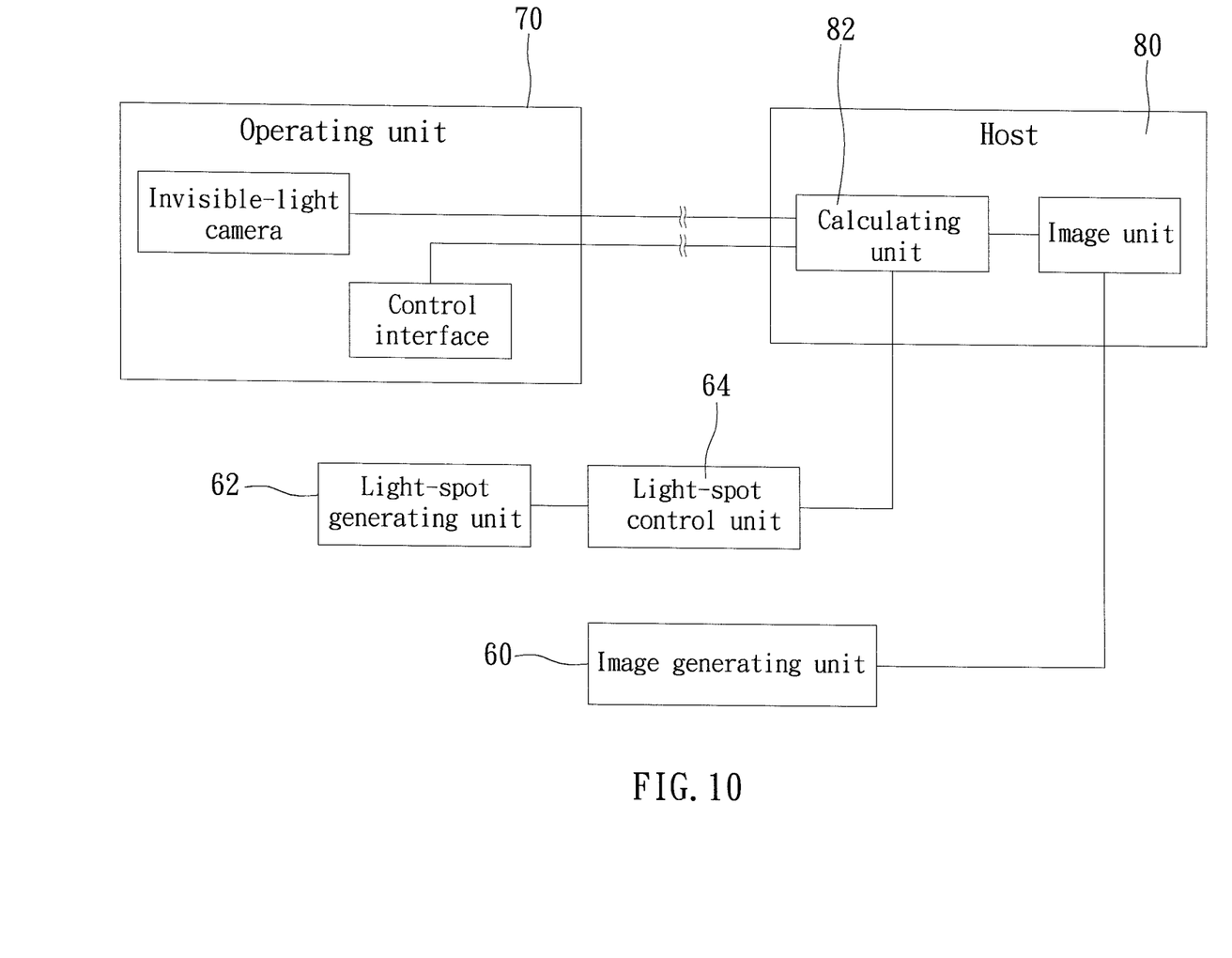
FIG. 10 is a block diagram of a third preferred embodiment of the present invention.

FIG. 10 shows a pointer positioning system of the third preferred embodiment of the present invention, which includes an image generating unit 60, a light-spot generating unit 62, a light-spot control unit 64, an operating unit 70, a host 80, and a calculating unit 82. The different part of the third preferred embodiment is that the calculating unit 82 is provided in the host 80, not in the operating unit 70. That may reduce a size and a weight of the operating unit 70, and the operating unit 70 will be easier for a user to operate.

Figure 11:
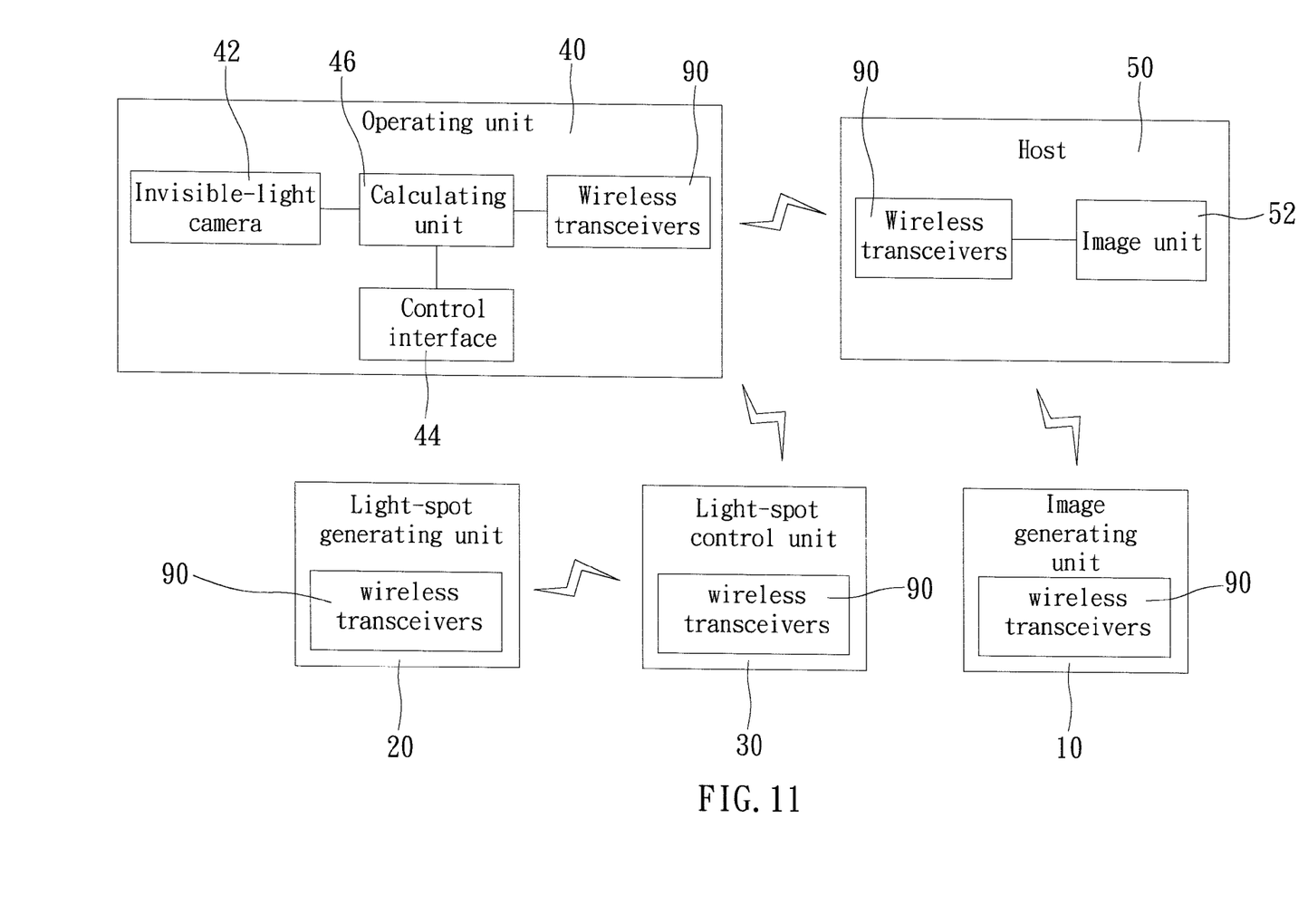
FIG. 11 is a block diagram of a fourth preferred embodiment of the present invention.

FIG. 11 shows a pointer positioning system of the fourth preferred embodiment of the present invention, which is similar to the second embodiment. The pointer positioning system of the fourth preferred embodiment further includes wireless transceivers 90 respectively in the image generating unit 10, the light-spot generating unit 20, the light-spot control unit 30, the operating unit 70, and the host 50. The wireless transceivers 90 serve the function of transmitting and receiving all the signals as described above through wireless communication.

Figure 12:
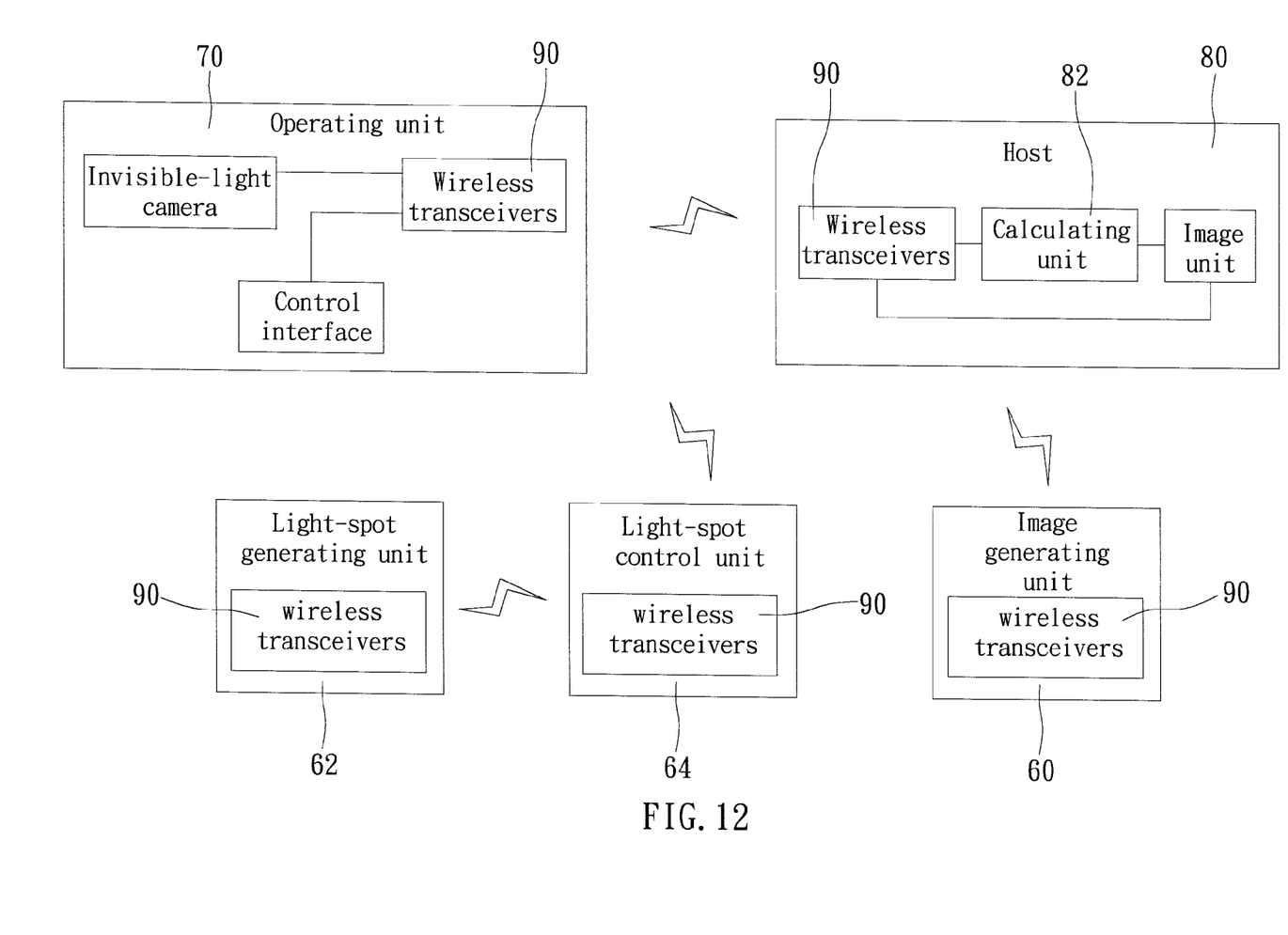
FIG. 12 is a block diagram of a fifth preferred embodiment of the present invention.

FIG. 12 shows a pointer positioning system of the fifth preferred embodiment of the present invention, which is similar to the third embodiment. The pointer positioning system of the fifth preferred embodiment further includes wireless transceivers 90 respectively on the image generating unit 60, the light-spot generating unit 62, the light-spot control unit 54, the operating unit 70, and the host 80. The wireless transceivers 90 serve the function of transmitting and receiving all the signals as described above through wireless communication.

It is noted that the positioning spots 20 at a margin of the display region 100 may be replaced by infrared markers. In an embodiment, the infrared markers are infrared ray LEDs arranged in the margin of the display region 100 to emit infrared rays. The infrared markers may be any device which emits or reflects invisible light to be sensed by the invisible-light camera.

The description above is a few preferred embodiments of the present invention. The equivalence of the present invention is still in the scope of claim construction of the present invention.

What is claimed is:

1. A pointer positioning system, comprising:
an image generating unit for forming an image on a display region;
a light-spot generating unit for projecting invisible light to form invisible-light spots on the display region, wherein the invisible-light spots include positioning spots and identifying spots, and the positioning spots divide the display region into several sections, further wherein the positioning spots have different parts respectively in the neighboring sections, so that each of the sections has some of the positioning spots therein, and an arrangement of the positioning spots in one of the sections is different from an arrangement of the positioning spots in the other one of the sections;
an operating unit having an invisible-light camera to sense an image of a part of the entire display region, wherein the operating unit generates an identification signal according to a distribution of the positioning spots and the identifying spots in the image sensed by the invisible-light camera;
a calculating unit having a memory to store a reference distribution of the positioning spots and the identifying spots, wherein the calculating unit receives the identification signal from the operating unit and compares the distribution of the positioning spots and the identifying spots which is sensed by the invisible-light camera with the reference distribution to obtain a position signal accordingly, further wherein the position signal indicates a pointing position in the image sensed by the invisible-light camera;
an image unit receiving the position signal from the calculating unit and generating an image signal, wherein the image signal is transmitted to the image generating unit to show a pointer image at the pointing position of the display region; and
a light-spot control unit electrically connected to the light-spot generating unit and the calculating unit, wherein the light-spot control unit controls the light-spot generating unit to change a distribution of the positioning spots and the identifying spots on the display region, and the distribution is transmitted to the calculating unit and stored in the memory to be the reference distribution.

2. The pointer positioning system as defined in claim 1, wherein the pointing position is a center of the image sensed by the invisible-light camera.

3. The pointer positioning system as defined in claim 2, wherein the calculating unit obtains a coordinate of the pointing position relative to the section where the pointing position is located, and then obtains an absolute coordinate of the pointing position relative to the display region.

4. The pointer positioning system as defined in claim 1, further comprising a plurality of infrared markers at a margin of the display region to be the positioning spots, wherein the infrared markers are able to be sensed by the invisible-light camera.

5. The pointer positioning system as defined in claim 4, wherein the infrared markers emit or reflect invisible light.

6. The pointer positioning system as defined in claim 1, wherein the invisible light projected from the light-spot generating unit is infrared laser with a central wavelength of 850 nm.

7. The pointer positioning system as defined in claim 1, wherein the invisible light projected from the light-spot generating unit is infrared laser with a central wavelength of 940 nm.

8. The pointer positioning system as defined in claim 1, wherein the operating unit further has a control interface electrically connected to the calculating unit, wherein the control interface is operated to transmit a control signal to the calculating unit to show a specified image at the pointing position.

9. The pointer positioning system as defined in claim 1, wherein the calculating unit is provided in the operating unit.

10. The pointer positioning system as defined in claim 1, further comprising a host, in which the calculating unit and the image unit are provided, wherein the host is electrically connected to the operating unit.

11. The pointer positioning system as defined in claim 1, further comprising at least two wireless transceivers for transmission of the identification signal, the position signal, or the image signal.

* * * * *